United States Patent [19]

Gellert

[11] Patent Number: 4,932,858

[45] Date of Patent: Jun. 12, 1990

[54] INJECTION MOLDING SYSTEM HAVING DUAL FEED BUSHING SEATED IN MANIFOLD

[76] Inventor: Jobst U. Gellert, 7A Prince Street, Georgetown, Ontario, Canada, L7G 2X1

[21] Appl. No.: 377,065

[22] Filed: Jul. 10, 1989

[30] Foreign Application Priority Data

Jun. 30, 1989 [CA] Canada .................................. 604608

[51] Int. Cl.$^5$ ............................................. B29C 45/22
[52] U.S. Cl. .................. 425/564; 264/328.8; 264/328.9; 425/566; 425/570; 425/572; 425/588
[58] Field of Search ............... 425/549, 562, 563, 564, 425/566, 570, 572, 588; 264/328.9, 328.15, 328.8

[56] References Cited

U.S. PATENT DOCUMENTS

| | | | |
|---|---|---|---|
| 4,026,518 | 5/1977 | Gellert | 425/566 |
| 4,268,240 | 5/1981 | Rees et al. | 425/570 |
| 4,433,969 | 2/1984 | Gellert | 425/566 |
| 4,521,179 | 6/1985 | Gellert | 264/328.15 |
| 4,698,013 | 10/1987 | Butcher | 425/563 |
| 4,705,473 | 11/1987 | Schmidt | 425/566 |
| 4,740,151 | 4/1988 | Schmidt | 425/566 |

OTHER PUBLICATIONS

Random House, American College Dictionary, 1947, p. 459.

Primary Examiner—Jay H. Woo
Assistant Examiner—Timothy W. Heitbrink
Attorney, Agent, or Firm—Riches, McKenzie & Herbert

[57] ABSTRACT

A multi-cavity valve gated injection molding system having an elongated manifold through which a melt passage to a number of heated nozzles. A separate valve member bushing is seated in an opening through the manifold in alignment with each nozzle. The bushing is in bearing contact between the back plate and the rear face of each nozzle. The bushing has a melt duct with two smoothly curved arms which connect between the melt passage in the manifold and the melt passage around the valve member. The bushing provides a seal around the reciprocating valve member and has an outer flange which forms a combination insulative air space and containment chamber for melt which does escape.

2 Claims, 2 Drawing Sheets

INJECTION MOLDING SYSTEM HAVING DUAL FEED BUSHING SEATED IN MANIFOLD

BACKGROUND OF THE INVENTION

This invention relates generally to injection molding and more particularly to a multi-cavity valve gated injection molding system in which each valve member extends through a bushing which is received in an opening extending through the manifold. The bushing has a melt duct with two smoothly curved arms to convey melt from the manifold to the adjoining nozzle.

It is well known that providing for smooth flow of pressurized melt is critical to successful molding of certain materials. Sharp bends, corners or dead spots in the melt passage results in unacceptable resident time for some portion of the melt being processed which can cause too much delay on colour changes and/or result in decomposition of some materials or pigments of some materials such as polyvinyl chloride and some polyesters or other high temperature crystaline materials. In most multi-cavity valve gated injection molding systems it is necessary for the melt flow passage to change direction by 90° and to join the bore around the reciprocating valve member as it extends from the manifold to each nozzle. Furthermore, substantial seepage of the pressurized melt as the valve member reciprocates must be avoided.

These problems necessarily require fine tolerance machining to overcome and it is well known to facilitate this by providing a separate bushing seated in the nozzle as disclosed in the applicant's U.S. Pat. No. 4,026,518 which issued May 31, 1977. A similar arrangement for multi-cavity molding is shown in the applicant's U.S. Pat. No. 4,521,179 which issued June 4, 1985. The applicant's U.S. Pat. No. 4,433,969 which issued Feb. 28, 1984 then shows a multi-cavity arrangement in which the bushing is located between the manifold and the nozzle. More recently U.S. Pat. No. 4,705,473 to Schmidt which issued Nov. 10, 1987 provides a bushing in which the melt duct in the bushing splits into two smoothly curved arms which connect to opposite sides of the valve member bore. Finally, U.S. Pat. No. 4,740,151 to Schmidt, et al which issued Apr. 26, 1988 shows a multi-cavity system with a different sealing and retaining bushing having a flanged portion mounted between the manifold and the back plate.

Of course, the bushing must have a minimum thickness (or height) to provide the necessary melt passage and the seal around the reciprocating valve member. On the other hand, reducing the overall thickness (or height) of the system is often very important, particularly in view of the recent trend to system size reduction. Locating the bushing between the manifold and the nozzle has the disadvantage that it increases the system height and providing separate bushings on opposite sides of the manifold only magnifies the problem.

SUMMARY OF THE INVENTION

Accordingly, it is an object of the invention to at least partially overcome the disadvantages of the prior art by providing a multi-cavity valve gated injection molding system wherein each valve member passes through a bushing which is received in a hole in the manifold and extends between the back plate and the nozzle.

To this end, in one of its aspects, the invention provides a multi-cavity valve gated injection molding system having an elongated manifold extending between a back plate having a front surface and a plurality of spaced heated nozzles, each nozzle having a rear face and being seated in a well in a cooled cavity plate, each nozzle having a central bore extending therethrough in alignment with a gate leading to a cavity, an elongated valve member having a rear end and a forward end mounted in the central bore through the nozzle to extend rearwardly through the manifold, a valve member actuating mechanism mounted in the back plate to engage the rear end of the valve member to drive the valve member between an open position and a closed position wherein the forward end is seated in the gate, and a melt passage which branches from a common inlet and extends through the manifold and around the valve member in the central bore of each nozzle to convey pressurized melt to each gate, the improvement wherein a valve member bushing is received in an opening extending through the manifold in alignment with each of the nozzles, the valve member bushing having a rear portion which abuts against the front surface of the back plate and a front face which abuts against the rear face of the respective nozzle, the valve member bushing having a valve member bore extending therethrough in alignment with the central bore through the nozzle to receive the valve member therethrough, the valve member bore having a rear portion and a front portion, the rear portion having a uniform diameter to snugly receive the valve member therethrough to prevent substantial melt seepage therebetween as the valve member reciprocates, the front portion of the valve member bore being substantially larger in diameter than the rear portion, the valve member bushing having a melt duct which extends inwardly from an inlet in alignment with the melt passage through the manifold and branches into two smoothly curved arms which connect to the front portion of the valve member bore on opposite sides thereof Further objects and advantages of the invention will appear from the following description taken together with the accompanying drawings.

DETAILED DESCRIPTION OF THE DRAWINGS

Figure 1:
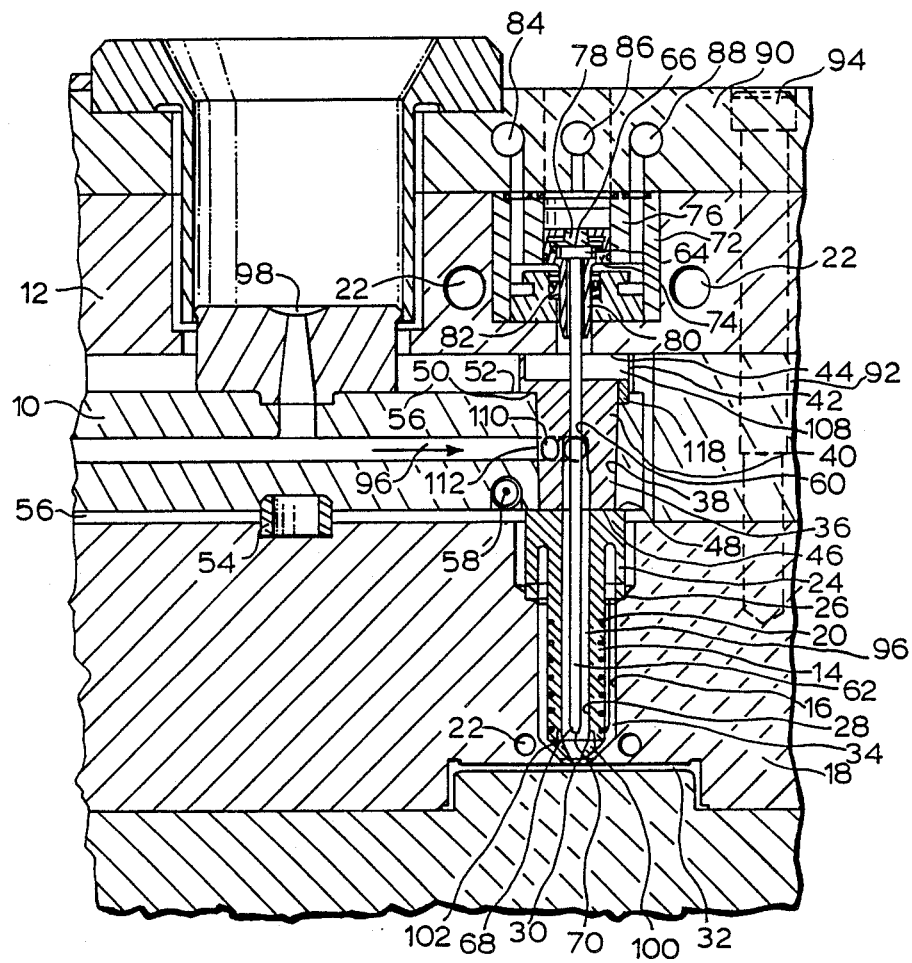
FIG. 1 is a sectional view of a portion of a multi-cavity valve gated injection molding system showing a valve member extending through a valve member bushing according to a preferred embodiment of the invention.

Reference is first made to FIG. 1 which shows a portion of a multi-cavity valve gated injection molding system wherein an elongated manifold 10 extends between a back plate 12 and a number of nozzles 14, each of which is seated in a well 16 in a cavity plate 18. Each nozzle 14 is heated by a helical electric heating element 20 which is integrally cast into it and the back plate 12 and cavity plate 18 are cooled by pumping cooling water through cooling conduits 22. The nozzle 14 has an insulation flange 24 which sits against an inwardly projecting shoulder 26 in the well 16. This locates the nozzle 14 with its central bore 28 in alignment with a gate 30 extending through the cavity plate 18 leading to the cavity 32 and provides an insulative air space 34 between the heated nozzle 14 and the surrounding cooled cavity plate 18.

A valve member bushing 36 according to the invention is received in an opening 38 extending through the elongated manifold 10 in alignment with each of the nozzles 14. As described in more detail below, each valve member bushing 36 has a rear portion 40 with an outer flange 42 which extends into contact against the front surface 44 of the back plate 12 and a front face 46 which abuts against the rear face 48 of the nozzle 14. The rear portion 40 of the valve member bushing 36 also has a circumferential shoulder 50 which bears against the rear surface 52 of the manifold Thus, the manifold is accurately located between the central locating ring 54 seated in the cavity plate 18, and the rear face 48 and circumferential shoulder 50 of each nozzle 14 and bushing 36. This provides insulative air spaces 56 between the manifold 10 which is heated by an integral electrical heating element 58 and the cooled back plate 12 and cavity plate 18.

Each valve member bushing 36 has a central bore 60 extending therethrough in alignment with the central bore 28 of the adjacent nozzle 14. An elongated valve member 62 extends through the aligned bores 28 and 60 of the nozzle 14 and bushing 36. The valve member 62 has an enlarged head 64 at its rear end 66 and a tapered tip 68 at its forward end 70. The head 64 of the valve member 62 is engaged by valve member actuating mechanism 72 which is seated in the back plate 12 to reciprocate the valve member 62 between a retracted open position and a forward closed position in which the tapered tip 68 is seated in the gate 30. In this embodiment, the actuating mechanism includes a piston 74 which reciprocates in a cylinder 76. The valve member 62 extends through the piston 74 and the enlarged head 64 is secured to it by a cap 78 as described in the applicant's U.S. Pat. No. 4,698,013 which issued Oct. 6, 1987. The piston 74 has an elongated neck portion 80 which protrudes out through a V-shaped high pressure seal 82 which is seated in the cylinder 76 to prevent leakage of pressurized hydraulic fluid. The actuating mechanism 72 is driven by pressurized hydraulic fluid through fluid lines 84,86,88 which extend through a back cover plate 90. The back cover plate 90, back plate 12 and a spacer plate 92 are secured together by bolts 94 which extend into the cavity plate 18.

A melt passage 96 branches in the elongated manifold 10 to convey melt received from a molding machine (not shown) at a common inlet 98 to the central bore 28 of each nozzle 14 which leads to a respective cavity 32. As can be seen, the diameter of the central bore 28 of the nozzle 14 is sufficiently larger than the outside diameter of the valve member 62 extending centrally therethrough to form part of the melt passage 96. A nozzle seal 100 is seated in the nose 102 of the nozzle 14 to prevent leakage of the melt into the air space 34.

Figure 2:
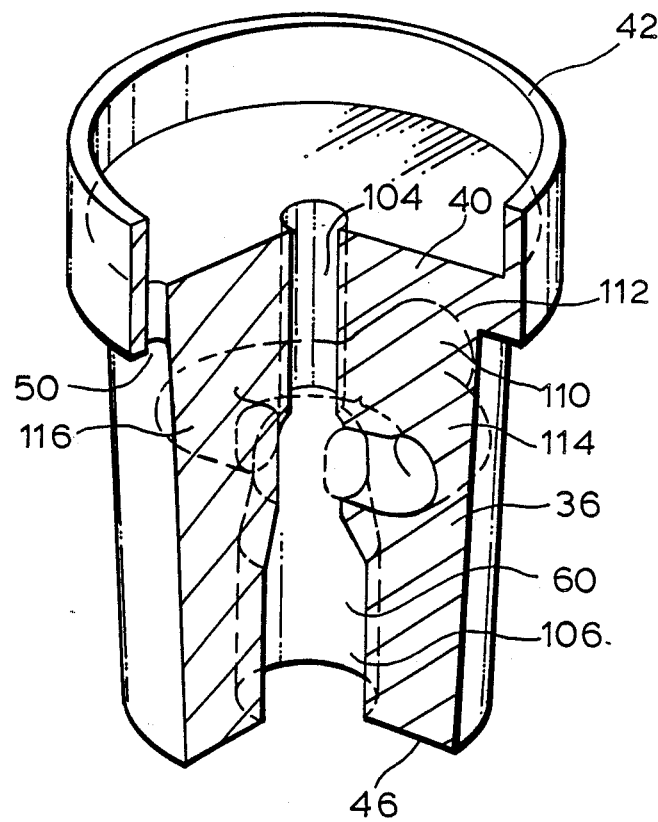
FIG. 2 is a cut-away isometric view of the bushing showing the configuration of the melt duct.

As clearly seen in FIG. 2, the central bore 60 of each valve member bushing 36 has a rear portion 104 and a larger diameter front portion 106. The front portion 106 is aligned with and the same diameter as the central bore 28 through the nozzle 14. The smaller diameter rear portion 104 is machined to snugly receive the valve member 62 therethrough to prevent substantial seepage of the melt between them as the valve member reciprocates. As seen in FIG. 1, the front surface 44 of the back plate 12 is in bearing contact against the circular outer flange 42 of the bushing 36 which forms a combination insulative air space and containment chamber 108 between them which receives melt which does seep past the reciprocating valve member 62 and prevents it escaping into the surrounding air space 56. Each valve member bushing 36 also has a melt duct 110 which forms part of the melt passage 96. The melt duct 110 in the bushing extends inwardly from an inlet 112 in alignment with the melt passage 96 through the manifold 10 and branches into two smoothly curved arms 114,116 which connect to the front portion 106 of the central bore 60 through the bushing 36 on opposite sides thereof. The bushing 36 has a locating pin 118 which extends into the manifold 10 to maintain the duct inlet 112 in proper alignment.

In use, the system is assembled as shown and electrical power is applied to the heating elements 20,58 to heat the nozzle 14 and manifold 10 to a predetermined operating temperature. Thermal expansion of the elongated manifold brings the central bore 60 of the bushing 36 into accurate alignment with the central bore 28 of the nozzle 14 and the force from the back plate 12 against the circular flange 42 of the bushing 36 prevents leakage between the nozzle and bushing and retains the nozzle 14 firmly in place. Hot pressurized melt is injected from a molding machine (not shown) into the melt passage 96 through the central inlet 98 according to a predetermined cycle. Controlled hydraulic fluid pressure is applied to the cylinders 76 through fluid lines 84,86,88 to simultaneously control actuation of the valve members 62 according to a predetermined cycle in a conventional manner. When the valve members 62 are in the retracted open position, the pressurized melt flows through the melt passage 96 and the gates 30 until the cavities 32 are full. The configuration of the melt duct 110 in each bushing 36 with the two smoothly curved arms 114,116 provides two separate streams of melt arriving on opposite sides of each valve member 62. This reduces problems with streaking which often occur when a single melt stream flows into a bore around a valve member. When the cavities 32 are full, injection pressure is held momentarily to pack. The hydraulic pressure is then reversed to reciprocate the valve member 62 to the forward closed position in which the forward end 70 of one of the valve members 62 is seated in each of the gates 30. The injection pressure is then released and, after a short cooling period, the mold is opened for ejection. After ejection, the mold is closed, hydraulic pressure is applied to retract the valve members 62 to the open position and melt injection pressure is reapplied to refill the cavities 32. The cycle is repeated continuously every few seconds with a frequency depending upon the number and size of the cavities and the type of material being molded.

In addition to reducing the overall thickness (or height) requirement of the system, the provision of a single bushing 36 which extends between the front surface 44 of the back plate 12 and the rear face 48 of each nozzle 14 provides both a melt duct 110 with smoothly curved arms 114,116 and a containment chamber 108 considerably facilitates manufacture and assembly.

While the description of the injection molding system has been given with respect to a preferred embodiment, it is not to be construed in a limiting sense. Variations and modifications will occur to those skilled in the art. Reference is made to the appended claims for a definition of the invention.

What I claim is:

1. In a multi-cavity valve gated injection molding apparatus having an elongated manifold extending between a back plate having a front planar surface and a plurality of spaced heated nozzles, each nozzle having a rear face and being seated in a well in a cooled cavity plate, each nozzle having a central bore extending therethrough in alignment with a gate leading to a cavity, an elongated valve member having a rear end and a forward end mounted in the central bore through each nozzle to extend rearwardly through the manifold, a valve member actuating mechanism mounted in the back plate to engage the rear end of each valve member to drive a respective valve member between an open position and a closed position wherein the forward end is seated in a gate, and a melt passage which branches from a common inlet and extends through the manifold and around the valve member in the central bore of each nozzle to convey pressurized melt to each gate, the improvement wherein:

a plurality of valve member bushings are received in respective openings extending through the manifold where each of the valve member bushings is in alignment with a respective nozzle, each valve member bushing having a rear portion which abuts against the front planar surface of the back plate, the rear portion having an outer flange which abuts against the front planar surface of the back plate to retain the manifold in position to form an insulative air space and containment chamber to receive melt which does leak past a reciprocating valve member, the valve member bushing having a front face which abuts against the rear face of a respective nozzle thereby facilitating disassembly, each valve member bushing having a valve member bore extending therethrough in alignment with the central bore through the nozzle to receive a valve member therethrough, the valve member bore having a rear portion and a front portion, the rear portion having a uniform diameter to snugly receive a valve member therethrough to prevent substantial melt seepage therebetween as the valve member reciprocates, the front portion of the valve member bore being substantially larger in diameter than the rear portion, each valve member bushing having a melt duct which extends inwardly from an inlet in alignment with the melt passage through the manifold and branches into two smoothly curved arms which connect to the front portion of the valve member bore on opposite sides thereof.

2. An injection molding apparatus as claimed in claim 1 wherein the rear portion of each valve member bushing has a forwardly facing shoulder, each valve member bushing being smaller in diameter than an adjoining nozzle, and the elongated manifold being located between the forwardly facing shoulder of each valve member bushing and the rear face of an adjoining nozzle.

* * * * *